(12) United States Patent
Higashimoto et al.

(10) Patent No.: US 7,683,150 B2
(45) Date of Patent: Mar. 23, 2010

(54) WATER-ABSORBENT POLYMER AND PROCESS FOR PRODUCING THE SAME

(75) Inventors: Naonori Higashimoto, Tokyo (JP); Tsutomu Nakagawa, Tokyo (JP)

(73) Assignee: Asahi Kasei Chemicals Corporation, Tokyo (JP)

( * ) Notice: Subject to any disclaimer, the term of this patent is extended or adjusted under 35 U.S.C. 154(b) by 294 days.

(21) Appl. No.: 11/493,860

(22) Filed: Jul. 27, 2006

(65) Prior Publication Data

US 2008/0027180 A1 Jan. 31, 2008

(51) Int. Cl.
*C08F 20/04* (2006.01)
(52) U.S. Cl. .................. 526/317.1; 526/89; 526/923
(58) Field of Classification Search .................. 526/319
See application file for complete search history.

(56) References Cited

U.S. PATENT DOCUMENTS

| 2004/0071966 | A1* | 4/2004 | Inger et al. ............... 428/394 |
| 2004/0106745 | A1* | 6/2004 | Nakashima et al. ......... 525/418 |
| 2005/0049379 | A1* | 3/2005 | Adachi et al. .............. 526/319 |
| 2005/0228154 | A1* | 10/2005 | Matsumoto et al. ...... 526/317.1 |

FOREIGN PATENT DOCUMENTS

| JP | 6-122708 | 5/1994 |
| JP | 8-509521 | 10/1996 |
| JP | 2001-524557 | 12/2001 |
| JP | 2004-315816 | 11/2004 |
| WO | 95/02002 | 1/1995 |
| WO | 99/26988 | 6/1999 |

OTHER PUBLICATIONS

English Transaltion of JP 2004-315816 A).*

* cited by examiner

*Primary Examiner*—David Wu
*Assistant Examiner*—Vu Nguyen
(74) *Attorney, Agent, or Firm*—Staas & Halsey LLP

(57) ABSTRACT

A water-absorbing resin has a polymer molecular chain in which 50 mol % or more of repeating units in the chain are carboxy group-containing units, wherein the carboxy group neutralization ratio in the central part of the resin is 60 mol % or more and the carboxy group neutralization ratio on the external surface of the resin is 50 mol % or less. A method for producing the water-absorbing resin comprises polymerizing a monomer solution to form a polymer, drying the resulting polymer, and heat-treating the dried polymer, wherein the monomer solution contains a mixture comprising an alkali metal salt of an unsaturated carboxylic acid and an ammonium salt thereof, the percentage of the ammonium salt being more than 50 mol % of the mixture, and further contains a condensation crosslinking agent.

8 Claims, 1 Drawing Sheet

[FIG. 1]
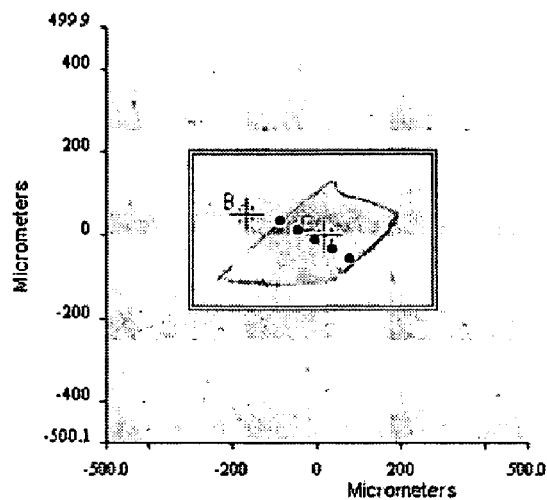
[FIG. 2]
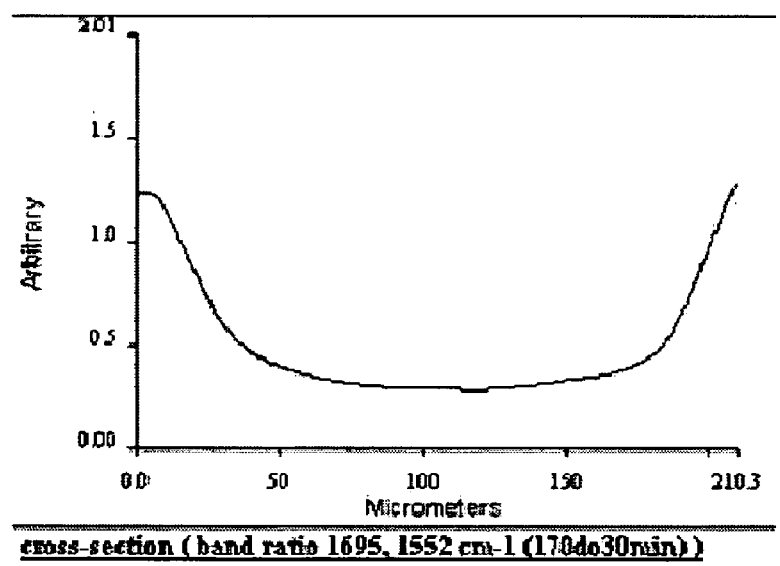

WATER-ABSORBENT POLYMER AND PROCESS FOR PRODUCING THE SAME

BACKGROUND OF THE INVENTION

1. Field of the Invention

The present invention relates to a water-absorbing resin widely used in the sanitary material field such as disposable diapers and sanitary napkins, the agriculture and forestry field, the civil engineering field, and the like, and to a method for producing the same. In particular, the present invention relates to a water-absorbing resin for the sanitary material field such as disposable diapers and sanitary napkins requiring a high water absorption capacity, and to a method for producing the same. More particularly, the present invention relates to a water-absorbing resin excellent in the water absorption capacity under pressure and under no pressure, and to a method for producing the same.

2. Description of the Related Art

In recent years, water-absorbing resins which gelate by absorbing large amounts of water are developed as one of synthetic polymers and widely used in the sanitary material field such as disposable diapers and sanitary napkins, the agriculture and forestry field, the civil engineering field, and the like. Many kinds of water-absorbing resins are known as these water-absorbing resins, including, for example, a crosslinked partially neutralized polyacrylic acid (for example, refer to Patent Document 1), a hydrolysate of a starch-acrylonitrile graft polymer (for example, refer to Patent Document 2), a neutralized product of a starch-acrylic acid graft polymer (for example, refer to Patent Document 3), a saponified product of a vinyl acetate-acrylate copolymer (for example, refer to Patent Document 4), and a hydrolysate of an acrylonitrile copolymer or an acrylamide copolymer (for example, refer to Patent Document 5).

The properties that the above-described water-absorbing resins should have include a high water absorption capacity and an excellent absorption rate when these resins are brought into contact with aqueous liquid such as body fluid, liquid permeability, gel strength of a swelled gel, the absorbing amount to absorb water from a substrate containing an aqueous liquid, and the like. However, the relationship between these properties does not necessarily show a positive correlation, but physical properties, such as liquid permeability, gel strength, and absorption rate, tend to be reduced as the water absorption capacity increases.

A technique to crosslink the vicinity of the surface of a water-absorbing resin is known as a method for improving various water absorption properties of these water-absorbing resins while keeping them in balance, and various versions of the technique have been proposed so far.

For example, various methods in which the following crosslinking agents are used therein are known, including a method of using a polyhydric alcohol (for example, refer to Patent Documents 6 and 7), a method of using a polyvalent glycidyl compound, a polyvalent aziridine compound, a polyvalent amine compound, or a polyvalent isocyanate compound (for example, refer to Patent Document 8), a method of using a glyoxal (for example, refer to Patent Document 9), a method of using a polyvalent metal (for example, refer to Patent Documents 10 and 11), and a method of using a silane coupling agent (for example, refer to Patent Documents 12, 13, and 14).

Further, attempts to perform a uniform surface crosslinking by coating a crosslinking agent on a surface of a water-absorbing resin during crosslinking reaction are known, including a method in which an inert inorganic powder is present (for example, refer to Patent Documents 15 and 16), a method in which a dihydric alcohol is present (for example, refer to Patent Document 17), a method in which water and an ether compound are present (for example, refer to Patent Document 18), and a method in which phosphoric acid is present (for example, refer to Patent Document 19), when the crosslinking agent is added.

Furthermore, as an application of the above-described methods, a method is also known in which, for the purpose of reducing a residual monomer, a neutralized monomer having a specific composition is mixed with a crosslinking agent as described above and the surface crosslinking is performed during the heat treatment of the resulting mixture (for example, refer to Patent Documents 20, 21, and 22). There is also disclosed a method for producing a water-absorbing resin excellent in the water absorption rate and water absorption capacity under pressure by conducting polymerization in the presence of a blowing agent and subjecting the resulting polymer to surface crosslinking treatment (for example, refer to Patent Document 23).

However, although the balance of various properties of the water-absorbing resin is improved by these methods, it is not yet sufficient, and further improvement is required. In particular, when the property requirement of the water-absorbing resin used in the absorber for sanitary articles having a reduced thickness by using a large amount of water-absorbing resin, which represent a notable trend in recent years, is taken into account, the current state of affairs is that the conventional methods as described above have not yet provided such resins with a sufficient level of physical properties.

Moreover, the demand of disposable diapers for elderly people is increasing as the increase of average life in recent years. For a disposable diaper for elderly people, a water-absorbing resin having "an excellent absorption ratio under high loads so that the diaper can make full use of the absorption capability even when heavier loads are applied to it during the wearing thereof" is more strongly required because the loads applied to the disposable diaper are heavier and the amount excreted per one time is larger than in the case of disposable diapers for infants. In addition, reduction in thickness like underwear tends to be strongly required for the performance required for disposable diapers. A typical solution to the requirement is a method to reduce the amount of pulp in the absorber of the disposable diaper and use a large amount of water-absorbing resin (for example, refer to Patent Document 24). In such an absorber, the water-absorbing resin is in a dense state and liable to cause gel blocking. As a result, conventional water-absorbing resins are inconveniently liable to cause reduction in water absorption capacity under pressure. On the other hand, when crosslinking density is increased to ensure the water absorption capacity under pressure, there may be a problem of reduction in water absorption capacity under no pressure.

[Patent Document 1] Japanese Patent Laid-Open No. 55-84304

[Patent Document 2] Japanese Patent Publication No. 49-43395

[Patent Document 3] Japanese Patent Laid-Open No. 51-125468

[Patent Document 4] Japanese Patent Laid-Open No. 52-14689

[Patent Document 5] Japanese Patent Publication No. 53-15959

[Patent Document 6] Japanese Patent Laid-Open No. 58-180233

[Patent Document 7] Japanese Patent Laid-Open No. 61-16903

[Patent Document 8] Japanese Patent Laid-Open No. 59-189103

[Patent Document 9] Japanese Patent Laid-Open No. 52-117393

[Patent Document 10] Japanese Patent Laid-Open No. 51-136588

[Patent Document 11] Japanese Patent. Laid-Open No. 61-257235 [Patent Document 12] Japanese Patent Laid-Open No. 61-211305 [Patent Document 13] Japanese Patent Laid-Open No. 61-252212 [Patent Document 14] Japanese Patent Laid-Open No. 61-264006 [Patent Document 15] Japanese Patent Laid-Open No. 60-163956 [Patent Document 16] Japanese Patent Laid-Open No. 60-255814

[Patent Document 17] Japanese Patent Laid-Open No. 1-292004

[Patent Document 18] Japanese Patent Laid-Open No. 2-153903 [Patent Document 19] National Publication of International Patent Application No. 1996-508517

[Patent Document 20] Japanese Patent Laid-Open No. 6-122707 [Patent Document 21] Japanese Patent Laid-Open No. 6-122708 [Patent Document 22] Japanese Patent Laid-Open No. 2004-315816 [Patent Document 23] National Publication of International Patent Application No. 1996-509521

[Patent Document 24] Japanese Patent Laid-Open No. 06-057010

SUMMARY OF THE INVENTION

The performance that the water-absorbing resin for the sanitary material application should have among others includes high water absorption performance under no pressure and under pressure. However, these properties are in a negative correlation, and it has been difficult to bring both the water absorption performance under no pressure and that under pressure to a high level.

On the other hand, absorptive articles such as disposable diapers are proceeding toward reduction in thickness thereof in recent years due to a problem of feeling of use and functionality thereof. As a result, the amount of usage of the water-absorbing resin for use in the absorption layer tends to increase (for example, refer to Japanese Patent Laid-Open No. 2000-000463). However, on the other hand, in the sanitary material application which is the main application of the water-absorbing resin, the reduction in the amount of usage of the water-absorbing resin is desired to cope with further reduction in thickness and cost of the water-absorbing articles, and the improvement of water absorption performance of the water-absorbing resin is required as a measure to solve these problems.

It is an object of the present invention to provide a water-absorbing resin which has a high water absorption performance under pressure and under no pressure that has been difficult to achieve and which can be suitably used for sanitary materials such as disposable diapers, sanitary napkins, and incontinence pads, and to provide a method for producing the water-absorbing resin of the present invention simply in a cost-effective manner.

As a result of intensive studies made by the present inventors to solve the above problems, it has been found that a water-absorbing resin characterized by having a specific structure in the distribution of the carboxy group neutralization ratio in the water-absorbing resin has an excellent water absorption performance.

Specifically, the present invention comprises the followings:

[1] A water-absorbing resin having a polymer molecular chain in which 50 mol % or more of repeating units in the chain are carboxy group-containing units, wherein the carboxy group neutralization ratio in the central part of the resin is 60 mol % or more and the carboxy group neutralization ratio on the external surface of the resin is 50 mol % or less.

[2] The water-absorbing resin according to the above-described [1], wherein the resin has a skin layer having a thickness of 13 µm or more inward from the external surface of the resin which is a part having a lower carboxy group neutralization ratio than that in the central part of the resin.

[3] The water-absorbing resin according to the above-described [1] or [2], wherein a condensation crosslinking agent for a carboxy group is distributed throughout the water-absorbing resin.

[4] The water-absorbing resin according to any of the above-described [1] to [3], wherein 50 mol % or more of neutral carboxylate salts in the polymer molecular chain is an ammonium salt.

[5] The water-absorbing resin according to any of the above-described [1] to [4], wherein the resin has a water absorption capacity of 22 times or more under a pressure of 0.8 psi.

[6] A method for producing a water-absorbing resin comprising the steps of:
 polymerizing a monomer solution to form a polymer,
 crushing the resulting polymer,
 drying the crushed polymer,
 milling the dried polymer, and then
 heat-treating the milled polymer; or
 polymerizing a monomer solution to form a polymer,
 crushing the resulting polymer,
 milling the crushed polymer,
 drying the milled polymer, and then
 heat-treating the dried polymer, wherein the monomer solution contains a carboxy group-containing monomer and satisfies the following conditions (1) and (2):
 (1) the monomer solution contains an ammonium unsaturated carboxylate (A), an unsaturated carboxylic acid alkali metal salt (B), and a condensation crosslinking agent for a carboxy group (C); and
 (2) the percentage of the ammonium unsaturated carboxylate (A) is more than 50 mol % and 100 mol % or less, and the percentage of the unsaturated carboxylic acid alkali metal salt (B) is 0 mol % or more and less than 50 mol %, based on the total amount of unsaturated carboxylate monomers in the monomer solution.

[7] The method for producing a water-absorbing resin according to the above-described [6], wherein the heat treatment is performed at a temperature of from 100 to 250° C.

[8] The method for producing a water-absorbing resin according to the above-described [6] or [7], wherein the resin contains a crosslinking agent polymerizable with unsaturated monomers (D) in addition to the condensation crosslinking agent for a carboxy group (C) as a crosslinking agent in the monomer solution.

[9] The method for producing a water-absorbing resin according to the above-described [8], which satisfies the following conditions (3) and (4):

(3) the content of the condensation crosslinking agent for a carboxy group (C) is from 0.01% by weight up to 20% by weight based on the weight of the total polymerizable monomers; and (4) the content of the crosslinking agent polymerizable with unsaturated monomers (D) is from 0.005 mol % up to 5 mol % based on the weight of the total polymerizable monomers.

[10] The method for producing a water-absorbing resin according to any of the above-described [6] to [9], wherein the ammonium unsaturated carboxylate (A) and the unsaturated carboxylic acid alkali metal salt (B) are each a (meth) acrylic acid salt.

[11] A water-absorbing resin produced by a method for producing a water-absorbing resin according to any of the above-described [6] to [10], wherein the resin has a polymer molecular chain in which 50 mol % or more of repeating units in the chain are carboxy group-containing units, wherein the carboxy group neutralization ratio in the central part of the resin is 60 mol % or more and the carboxy group neutralization ratio on the external surface of the resin is 50 mol % or less.

The water-absorbing resin of the present invention has a good water absorption performance even under pressure while keeping the water absorption performance under no pressure at a high level, and is suitable for sanitary material applications such as disposable diapers.

Moreover, the method for producing a water-absorbing resin of the present invention is very useful in that it can simply produce a resin excellent in water absorption performance under pressure without subjecting the resin to a surface-crosslinking treatment step which has been performed for producing a resin having a good balance between the water absorption capacity under no pressure and that under pressure.

BRIEF DESCRIPTION OF THE DRAWINGS

FIG. 1 is a photomicrograph of a sample section subjected to IR imaging, where a broken line shows a measured line; and FIG. 2 is a line profile obtained by digitizing the 1,695/1, 558 $cm^{-1}$ peak area ratio measured along the broken line of FIG. 1 in the IR imaging measurement, where the axis of ordinates shows the peak area ratio, and the axis of abscissas shows the measured position of the sample on the line.

DETAILED DESCRIPTION OF THE PREFERRED EMBODIMENTS

The present invention will now be described further in detail.

"About Water-Absorbing Resin"

The water-absorbing resin of the present invention is a water-absorbing resin having a polymer molecular chain in which 50 mol % or more of repeating units in the chain are carboxy group-containing units, wherein the carboxy group neutralization ratio in the central part of the resin is 60 mol % or more and the carboxy group neutralization ratio on the external surface of the resin is 50 mol % or less.

The carboxy group-containing units in the repeating units in the polymer molecular chain need to be 50 mol % or more, preferably 80 mol % or more, and more preferably 90 mol % or more in terms of water absorption performance.

The carboxy group-containing units composing the water-absorbing resin of the present invention include units derived from monomers such as acrylic acid, methacrylic acid, itaconic acid, maleic acid, crotonic acid, fumaric acid, sorbic acid, cinnamic acid and anhydrides and neutralized salts thereof.

The units containing no carboxy group which compose the water-absorbing resin of the present invention include hydrophilic units derived from nonionic compounds such as acrylamide, methacrylamide, N-ethyl(meth)acrylamide, N-n-propyl(meth)acrylamide, N-isopropyl(meth)acrylamide, N,N-dimethyl(meth)acrylamide, 2-hydroxyethyl (meth) acrylate, 2-hydroxypropyl(meth)acrylate, methoxypolyethyleneglycol(meth)acrylate, polyethyleneglycol mono(meth) acrylate, N-vinylpyrrolidone, N-acryloylpiperidine, and N-acryloylpyrrolidine; hydrophobic units derived from compounds such as (meth)acrylonitrile, styrene, vinyl chloride, butadiene, isobutene, ethylene, propylene, stearyl(meth) acrylate, and lauryl(meth)acrylate; and the like.

Moreover, the water-absorbing resin of the present invention may contain a unit as a crosslinking agent between polymer molecular chains. Examples of the crosslinking agent include units derived from diethyleneglycol diacrylate, N,N'-methylenebisacrylamide, polyethyleneglycol diacrylate, polypropyleneglycol diacrylate, trimethylolpropane diallyl ether, ally glycidyl ether, pentaerythritol triallyl ether, pentaerythritol diacrylate monostearate, bisphenol diacrylate, isocyanuric acid diacrylate, tetraallyloxyethane, diallyloxyacetate, and the like.

Moreover, the water-absorbing resin of the present invention may contain a unit which is condensed with a carboxy group-containing unit to form a crosslinking agent. Examples of the unit include glycidyl ether compounds such as ethyleneglycol glycidyl ether, trimethylolpropane triglycidyl ether, (poly)glycerin polyglycidyl ether, diglycerin polyglycidyl ether, and propylene glycol diglycidyl ether; polyhydric alcohols such as (poly)glycerin, (poly)ethylene glycol, propylene glycol, 1,3-propanediol, polyoxyethylene glycol, triethylene glycol, tetraethylene glycol, diethanolamine, and triethanolamine; polyvalent amines such as ethylenediamine, diethylenediamine, polyethyleneimine, and hexamethylenediamine; polyvalent ions such as zinc, calcium, magnesium, and aluminum ions; and the like.

"About the Carboxy Group Neutralization Ratio of the Resin"

The water-absorbing resin of the present invention has a distribution structure in which the carboxy group neutralization ratio of the internal part of the resin is higher than that of the external surface thereof (hereinafter the structure is called a core-shell structure). The carboxy group neutralization ratio in the central part of the resin is 60 mol % or more, preferably 65 mol % or more, and most preferably 70, mol % or more, and the carboxy group neutralization ratio on the external surface of the resin is 50 mol % or less, preferably 45 mol % or less, and most preferably 40 mol % or less. Preferably, when the carboxy group neutralization ratio in the central part of the resin is the value as described above, the reduction in the water absorption capacity under no pressure hardly occurs. In addition, preferably, when the carboxy group neutralization ratio on the external surface of the resin is the value as described above, the reduction in the water absorption capacity under pressure hardly occurs.

The external surface of the resin in the present invention refers to the part of the resin which is exposed to the outside of the resin. Further, the central part of the resin in the present invention refers to a deepest part of the resin from the external surface thereof.

In the water-absorbing resin of the present invention which has a core-shell structure in the internal part thereof, the average carboxy group neutralization ratio of the entire resin is preferably 30 mol % or more, more preferably 50 mol % or more. Significant reduction in the average carboxy group neutralization ratio of the entire resin is not preferred because it may reduce the water absorption capacity under no pressure.

The core-shell structure in the internal part of the resin which is the requirement of the present invention can be determined by measuring the carboxy group neutralization ratio on the external surface of the resin and in the central part of the resin using microscopic ATR spectroscopy, which is one of the infrared absorption spectroscopy. The carboxy group neutralization ratio on the external surface of the resin is determined by the microscopic ATR spectroscopy by directly measuring the external surface of the resin. The central part of the resin is determined by the microscopic ATR spectroscopy after the resin is cut by using, for example, an ultramicrotome (ULTRACUT N, manufactured by Reichert) to expose the central part thereof. As the measurement equipment, for example, FTS-575 manufactured by Bio-Rad Company or the like can be used.

As an index to determine the compositional ratio of carboxylic acids to carboxylates, the peak area ratio of 1,695 $cm^{-1}$ ($vC=O$ of carboxylic acids, base line 1,774-1,616 $cm^{-1}$) to 1,558 $cm^{-1}$ ($vCOO-$ of carboxylates, base line 1,616-1,500 $cm^{-1}$) (1,695/1,558 $cm^{-1}$) is calculated. Separately, partially crosslinked polyacrylic acids which are prepared by neutralizing 10 mol %, 30 mol %, 50 mol %, 70 mol %, 90 mol %, and 100 mol % of all the carboxylic acids with ammonia are measured as standard samples to prepare a calibration curve, from which the compositional ratio is determined.

A preferred aspect of the water-absorbing resin of the present invention is characterized in that the resin has a structure in which a surface layer of the resin having a lower carboxy group neutralization ratio than that of the central part of the resin has a thickness of 13 μm or more inward from the external surface of the resin. Here, the structure in which the surface layer of the resin has a lower carboxy group neutralization ratio than that of the central part of the resin and has an IR measurement result as described below of a predetermined value or less compared to that of the external surface the resin is defined as a skin structure. The resin of the present invention has a thickness of the skin structure of 13 μm or more, preferably 19 μm or more. A skin structure having a thickness of 13 μm or more is preferred because of improved water absorption performance under pressure.

The thickness of the skin structure in the resin can be measured by IR imaging measurement. The resin is cut to a section of a thickness of 2 μm with an ultramicrotome (ULTRACUT N, manufactured by Reichert) for measurement in accordance with the procedure of the IR transmission method. All areas of the cut sample are measured. The resin is cut such that it can be measured from the external surface to the deepest part thereof. Equipment such as Spot-Light manufactured by Perkin Elmer Corp. or the like is used for IR imaging measurement. As an index to determine the compositional ratio of carboxylic acids to carboxylates, the peak area ratio of 1,695 $cm^{-1}$ ($vC=O$ of carboxylic acids, base line 1,774-1,616 $cm^{-1}$) to 1,558 $cm^{-1}$ ($vCOO-$ of carboxylates, base line 1,616-1,500 $cm^{-1}$) (1,695/1,558 $cm^{-1}$) is calculated to convert the total absorbance image to the band ratio image. The thickness of the skin structure is defined as the distance from the external surface to the point where the band ratio value thereof is lower than that of the external surface by 40%.

"About Neutralized Salts"

Carboxy groups in the polymer molecular chain composing the water-absorbing resin of the present invention need to be partially neutralized. Types of the base for neutralizing carboxy groups are not particularly limited. Examples of the base include alkali metals such as sodium, potassium, and lithium, alkaline earth metals, and amines or ammonia. Preferred types of the base include at least one or more including ammonia. Ammonia is most preferred.

In the water-absorbing resin of the present invention, in order to increase the water absorption capacity, the neutral carboxylate salts in the polymer molecular chain are preferably composed of ammonium salts in an amount of 50 mol % or more, more preferably 70 mol % or more, and most preferably 100 mol %.

In a preferred aspect of the water-absorbing resin of the present invention, a condensation crosslinking agent (C) which is a crosslinking agent for carboxy groups is distributed throughout the water-absorbing resin. Methods to distribute the condensation crosslinking agent throughout the water-absorbing resin are not particularly limited, but the condensation crosslinking agent is preferably distributed throughout the water-absorbing resin before the resin is provided with a core-shell structure.

By distributing the condensation crosslinking agent throughout the resin, water absorption capacity under pressure can be higher than that in the case where the condensation crosslinking agent is present only in the vicinity of the surface, as in a conventional method in which the water-absorbing resin is produced by polymerization and subsequently the condensation crosslinking agent is impregnated into the resin. A part of the condensation crosslinking agent reacts with carboxy groups composing the water-absorbing resin which are not neutralized to form crosslinking. The water-absorbing resin of the present invention has a lower carboxy group neutralization ratio, which means a higher carboxy group concentration, in the vicinity of the surface thereof. As a result, the resin is more easily crosslinked in the vicinity of the surface than at the central part thereof. A similar phenomenon may occur in the case where the condensation crosslinking agent is localized only in the vicinity of the surface by a conventional surface crosslinking method, but the water-absorbing resin of the present invention is believed to be crosslinked more uniformly around the surface thereof. The result may lead to an excellent water absorption performance without unevenness and variation.

The shape of the water-absorbing resin of the present invention is not particularly limited as long as it does not make a modification to the scope of the present invention, but it includes spherical particle powder widely used for water-absorbing resins, irregular-shaped particle powder obtained by milling a larger resin than the particle to be produced, aggregated powder, short fiber, long fiber, sheet form or the like. Among others, spherical particle powder, aggregated powder, or irregular-shaped particle powder is preferred in terms of handling convenience such as ease of mixing with pulp as a use form in a sanitary material field. It preferably has a particle size of preferably from 40 μm to 2,000 μm, more preferably from 50 μm to 900 μm, and most preferably from 100 μm to 850 μm. Significantly small particle size may cause formation of fine powder, resulting in a problem in use such as increased dustability. Further, significantly large particle size may cause problems such as reduction in water absorption rate and uneven distribution of the water-absorbing resin in an absorber article.

To the water-absorbing resin of the present invention, deodorants, antibacterial agents, perfumes, various inorganic powders, foaming agents, pigments, dyes, short hydrophilic fibers, fertilizers, oxidants, reducing agents, water, salts, or the like may be further added, thereby providing various functions to the absorber to form a water-absorbing resin composition.

"About a Method for Producing the Water-Absorbing Resin of the Present Invention"

The method for producing the water-absorbing resin of the present invention includes, but not limited to, a method comprising polymerizing a monomer solution which contains a condensation crosslinking agent for a carboxy group and an unsaturated carboxylate to form a resin, drying the resulting resin, and then heat-treating the dried resin. In this case, it is necessary that at least one type of the counter cation of a carboxylic acid group of the polymer is the one which is easily vaporized and can be liberated and removed by heating such as ammonia or amines. Moreover, a resin obtained by neutralizing a polymer of an unsaturated carboxylic acid monomer by using a known method or a resin produced by hydrolyzing a polymer containing a nitrile group or an amide group may be heat-treated after the resin is produced.

Other methods for treating a carboxylate-containing resin to form a core-shell structure of the water-absorbing resin of the present invention other than the method of liberating and removing the counter cation by heat treatment include a method in which the surface layer of a uniformly neutralized resin is subjected to ion exchange by acid treatment, a method in which two types of monomers having different neutralization ratio are polymerized to form a polymer having a layered structure, and the like. The above-described method of heat-treating a resin obtained by copolymerizing unsaturated carboxylate monomers is preferred. That is, a preferred method comprises the steps of polymerizing an aqueous monomer solution to form a polymer, drying the polymer, milling the dried polymer, and then heat-treating the milled polymer; or polymerizing an aqueous monomer solution to form a polymer, milling the polymer, drying the milled polymer, and then heat-treating the dried polymer, wherein the aqueous monomer solution contains (i) an ammonium unsaturated carboxylate (A) and a condensation crosslinking agent for a carboxy group (C), or (ii) an ammonium unsaturated carboxylate (A), an unsaturated carboxylic acid alkali metal salt (B), and a condensation crosslinking agent for a carboxy group (C).

"About a Monomer Solution"

The monomer solution used in the present invention contains (i) an ammonium unsaturated carboxylate (A) and a condensation crosslinking agent for a carboxy group (C), or (ii) an ammonium unsaturated carboxylate (A), an unsaturated carboxylic acid alkali metal salt (B), and a condensation crosslinking agent for a carboxy group (C). It is necessary that the percentage of the ammonium unsaturated carboxylate (A) is more than 50 mol % and 100 mol % or less based on the total amount of unsaturated carboxylate monomers in the monomer solution and that the percentage of the unsaturated carboxylic acid alkali metal salt (B) is 0 mol % or more and less than 50 mol % based on the total amount of unsaturated carboxylate monomers in the monomer solution. Moreover, the monomer solution desirably contains a monomer which can be a carboxylic acid group in an amount of 50 mol % or more of the total molar amount of all polymerizable monomers (the sum of the respective molar amounts of the ammonium unsaturated carboxylate (A), the unsaturated carboxylic acid alkali metal salt (B), an unsaturated carboxylic acid, and other monomers; hereinafter the same).

The content of other monomers containing no carboxylic acid group in the polymerizable raw material solution is desirably in the range of from 0 to 45 mol % relative to the total molar amount of all polymerizable monomers. Since the other monomers containing no carboxylic acid group are used for improving absorptive resins according to various purposes, the optimum amount of usage thereof is different for each purpose. In order to suppress the reduction in the absorption capacity of the absorptive resins, the amount of the other monomers is preferably used in a small amount. The amount is preferably in the range of from 0 to 20 mol %, more preferably in the range of from 0 to 5 mol %.

It is within the scope of the present invention that a surfactant, an inorganic compound, short fibers or the like is added to a monomer solution for the purpose of improving physical properties of the water-absorbing resin after polymerization and then the resulting mixture is subjected to polymerization.

The monomer solution used for polymerization which contains unsaturated carboxylates as a main component has a monomer concentration of generally 20% by weight or more, preferably 25% by weight or more, and the concentration is desirably equal to or less than the solubility of monomers in water. For example, in the case of ammonium acrylate, the concentration is preferably in the range of from 30 to 80% by weight, more preferably in the range of from 35 to 70% by weight. When the concentration is less than 20% by weight, the water absorption capability of the water-absorbing resin after polymerization may not be obtained sufficiently. The higher the monomer concentration, the easier the molecular weight is increased and the easier the self-crosslinking reaction proceeds. As a result, it is possible to reduce the amount of usage of the crosslinking agent polymerizable with unsaturated monomers (D) that is required for insolubilization, and the resulting water-absorbing resin has a very high water absorption capacity.

"About an Ammonium Unsaturated Carboxylate (A) and an Unsaturated Carboxylic Acid Alkali Metal Salt (B)"

The ammonium unsaturated carboxylate (A) preferably includes an ammonium salt of acrylic acid, methacrylic acid, itaconic acid, maleic acid, crotonic acid, fumaric acid, sorbic acid, or cinnamic acid, most preferably an ammonium salt of (meth)acrylic acid.

The unsaturated carboxylic acid alkali metal salt (B) preferably includes an alkali metal salt of acrylic acid, methacrylic acid, itaconic acid, maleic acid, crotonic acid, fumaric acid, sorbic acid, or cinnamic acid, most preferably an alkali metal salt of (meth)acrylic acid. The alkali metal in the unsaturated carboxylic acid alkali metal salt (B) includes lithium, sodium, or potassium.

The ammonium unsaturated carboxylate (A) and the unsaturated carboxylic acid alkali metal salt (B) are prepared such that the composition thereof contains (A) in an amount of more than 50 mol % and 100 mol % or less and (B) in an amount of 0 mol % or more and less than 50 mol % based on the total amount of unsaturated carboxylate monomers in the monomer solution (the sum of the respective molar amounts of the ammonium unsaturated carboxylate (A), the unsaturated carboxylic acid alkali metal salt (B), and an unsaturated carboxylic acid).

The method for producing unsaturated carboxylates may include, but not limited to, a method for producing the unsaturated carboxylates by directly neutralizing unsaturated carboxylic acids with alkali metal hydroxides, bicarbonates or the like, ammonium carbonate, ammonia water; ammonia gas, or the like, or a method for producing the unsaturated carboxylates by hydrolyzing monomers such as (meth)acrylonitrile or (meth)acrylamide. Here, the production method by hydrolysis includes a method of hydrolyzing monomers in an alkali atmosphere by a base catalyst such as ammonia or sodium hydroxide and a method of hydrolyzing monomers by an enzyme catalyst from microorganisms or the like.

"About a Method for Obtaining Ammonium Unsaturated Carboxylates by Hydrolysis by Microorganisms"

An unsaturated nitrile to be subjected to hydrolysis reaction by microorganisms refers to a compound having both an unsaturated bond and a cyano group in a molecule. The unsaturated nitrile may contain a number of unsaturated bonds and cyano groups. The unsaturated bond refers to a double bond (ethylene bond) or a triple bond (acetylene bond) between adjacent carbon atoms. Examples of such compounds include acrylonitrile, methacrylonitrile, crotonitrile, cinnamonitrile, and the like. Among others, acrylonitrile and methacrylonitrile are preferred, and acrylonitrile is most preferred.

Further, an unsaturated amide to be subjected to hydrolysis reaction by microorganisms refers to a compound having both an unsaturated bond and a functional group represented by the general formula: $R-CONH_2$ (wherein R denotes an alkyl group, an aryl group, or the like) in a molecule. Examples of such compounds include cinnamamide, acrylamide, methacrylamide, and the like. Among others, acrylamide and methacrylamide are preferred, and acrylamide is most preferred.

Conditions for hydrolysis of unsaturated nitrites and/or unsaturated amides by microorganisms are not particularly limited, but the microorganisms preferably include those capable of producing an aqueous ammonium unsaturated carboxylate solution with a concentration of 20% by weight or more. Examples of the microorganisms to be used preferably include at least one selected from the group consisting of *Acinetobacter, Alcaligenes, Corynebacterium, Rhodococcus*, and *Gordona*. Among the above-described microorganisms, *Acinetobacter* is preferred. Among others, *Acinetobacter* sp. AK 226 strain (FERM BP-08590) or *Acinetobacter* sp. AK-227 strain (FERM BP-08591) is most preferred. Microbiological properties of *Acinetobacter* sp. AK 226 strain (FERM BP-08590) and *Acinetobacter* sp. AK-227 strain (FERM BP-08591) are shown below.

|  | AK 226 | AK 227 |
|---|---|---|
| (a) Form |  |  |
| 1. Cell shape and size | *bacillus* | *bacillus* |
|  | 1.0-1.2 × 1.4-2.7 μm | 1.0-1.6 × 1.5-2.6 μm |
| 2. Cell diversity | No | No |
| 3. Motility | No | No |
| 4. Spore | No | No |
| 5. Gram stainability | – | – |
| 6. Oxidation resistance | – | – |
| (b) Growing state in each culture medium |  |  |
| 1. Bouillon agar plate culture | circular, translucent, with gloss, pale yellowish white | circular, translucent, with gloss, pale yellowish white |
| 2. Bouillon agar slant culture | medium degree of growth, smooth surface, with gloss, translucent, pale yellowish white | medium degree of growth, smooth surface, with gloss, translucent, pale yellowish white |
| 3. Bouillon liquid culture | forming pellicle, medium degree of growth, precipitate formed | forming pellicle, medium degree of growth, precipitate formed |
| 4. Bouillon gelatin stab culture | good growth at the surface, not liquefied | good growth at the surface, not liquefied |
| 5. Litmus milk | No change | No change |
| (c) Physiological properties |  |  |
| 1. Reduction of nitrate | – | – |
| 2. Denitrification | – | – |
| 3. MR test | – | – |
| 4. VP test | – | – |
| 5. Formation of indole | – | – |
| 6. Formation of hydrogen sulfide | – | – |
| 7. Hydrolysis of starch | – | – |
| 8. Utilization of citric acid | cinnamon medium+ | cinnamon medium+ |
| 9. Utilization of inorganic nitrogen source | nitrate– ammonium salt– | nitrate– ammonium salt– |
| 10. Formation of pigment | King-A medium– King-B medium– | King-A medium– King-B medium– |
| 11. Urease | – | – |
| 12. Oxidaze | – | – |
| 13. Catalase | + | + |
| 14. Hydrolysis of cellulose | – | – |
| 15. Range of growth | pH 5-12 Temperature 10-40° C. | pH 5-12 Temperature 10-45° C. |
| 16. Attitude to oxygen | aerobic | aerobic |
| 17. O-F test | – | 0 |

-continued

| | AK 226 | | AK 227 | |
|---|---|---|---|---|
| 18. Heat resistance 10% skim milk | 55° C./15 min: completely killed | | 55° C./15 min. mostly killed | |
| 19. Formation of acid and | Acid | Gas | Acid | Gas |
| gas from sugar | | | | |
| L-Arabinose | − | − | − | − |
| D-Xylose | − | − | − | − |
| D-Glucose | − | − | − | − |
| D-Mannose | − | − | − | − |
| D-Fructose | − | − | + | − |
| Malt sugar | − | − | − | − |
| Cane sugar | − | − | − | − |
| Milk sugar | − | − | − | − |
| Trehalose | − | − | − | − |
| D-Sorbitol | − | − | − | − |
| D-Mannitol | − | − | − | − |
| Inositol | − | − | − | − |
| | − | − | − | − |
| | − | − | − | − |

The aqueous ammonium unsaturated carboxylate solution formed by the hydrolysis by microorganisms contains only a very small amount of impurities such as dimers and/or hydrates of unsaturated carboxylic acids. Therefore, this production method is a preferred method.

Examples of the impurities include, specifically in the case of acrylic acid, β-acryloyloxypropionic acid which is a dimer of acrylic acid, β-hydroxypropionic acid which is a hydrate of acrylic acid, and salts thereof, and the like.

"A Method for Neutralizing Unsaturated Carboxylic Acids with Ammonia"

Similar unsaturated carboxylic acids to those described above are used as the unsaturated carboxylic acids in the method for neutralizing unsaturated carboxylic acids with ammonia.

The unsaturated carboxylic acids may be produced by any production method. When a large quantity of impurities is contained in the unsaturated carboxylic acids, the impurities are preferably reduced by purification. Here, the impurities refer to compounds which may be decomposed to monomer components. Examples of the impurities include hydrates of unsaturated bonds and oligomers, and more specifically, β-hydroxypropionic acid and β-acryloyloxypropionic acid in the case of acrylic acid. The method of purification is not particularly limited, but any method may be adopted as long as it can reduce the amount of impurities to a specified amount or less. For example, activated carbon treatment or distillation may be carried out as the method of purification. The amount of impurities is preferably reduced to 1,000 ppm or less, more preferably to 500 ppm or less, further preferably to 300 ppm or less, and most preferably to 100 ppm or less. A high content of impurities is not preferred because the resulting water-absorbing resin contains a large quantity of residual monomers; a phenomenon is observed that subsequent production steps cause the residual monomers to increase; and various physical properties of the polymer may be insufficient.

A method of neutralization is not particularly limited, but ammonia water or ammonia gas may be used. The neutralization may be performed under the condition where the neutralization ratio of acrylic acid exceeds 100 mol % at least during a certain period of the neutralization step. In the neutralization step, the temperature is preferably maintained at 0 to 50° C. by cooling. Excessively high temperature is not preferred because it may lead to formation of β-hydroxypropionic acid or oligomers.

"Other Copolymerizable Monomers"

Other monomers may be copolymerized in the resin of the present invention provided that the content of carboxylic acid groups in all the functional groups of the resin is within the range of 50 mol % or more. Unsaturated monomers which may be copolymerized include (I) anionic unsaturated monomers and salts thereof including (meth)acrylic acid, itaconic acid, maleic acid, crotonic acid, sorbic acid, cinnamic acid, and anhydrides thereof, vinylsulfonic acid, allylsulfonic acid, styrenesulfonic acid, vinyltoluenesulfonic acid, 2-(meth)acrylamide-2-methylpropanesulfonic acid, 2-(meth)acryloylethanesulfonic acid, 2-(meth)acryloylpropanesulfonic acid, 2-hydroxyethylacryloyl phosphate, 2-hydroxyethylmethacryloyl phosphate, phenyl-2-acryloyloxyethyl phosphate, and vinylphosphoric acid; and (II) hydrophilic group-containing nonionic unsaturated monomers including acrylamide, methacrylamide, N-ethyl(meth)acrylamide, N-n-propyl(meth)acrylamide, N-isopropyl(meth)acrylamide, N,N-dimethyl(meth)acrylamide, 2-hydroxyethyl(meth)acrylate, 2-hydroxypropyl(meth)acrylate, methoxypolyethyleneglycol(meth)acrylate, polyethyleneglycol mono(meth)acrylate, N-vinylpyrrolidone, N-acryloylpiperidine, and N-acryloylpyrrolidine. Further, in order to obtain the water-absorbing resin of the present invention, hydrophilic monomers may be used for polymerization which form the water-absorbing resin by hydrolyzing functional groups thereof after polymerization such as methyl(meth)acrylate, ethyl(meth)acrylate, and vinyl acetate.

Further, hydrophobic monomers which can be used in combination include (meth)acrylonitrile, styrene, vinyl chloride, butadiene, isobutene, ethylene, propylene, stearyl(meth)acrylate, lauryl(meth)acrylate, and the like. One type or two types or, more of these monomers may be added.

"About Crosslinking Agent"

Examples of the method for crosslinking the water-absorbing resin include a method in which the resin is crosslinked by using a condensation crosslinking agent to react it with a functional group in the resin, a method in which the resin is crosslinked by using a polymerizable crosslinking agent to copolymerize it with an unsaturated monomer, and a method in which the resin is crosslinked by irradiating it with electron beams or radiation.

Preferred is a method of using a condensation crosslinking agent for a carboxy group (C), and most preferred is a method of copolymerizing a crosslinking agent polymerizable with unsaturated monomers (D) with an unsaturated monomer in the presence of a condensation crosslinking agent for a carboxy group (C).

Examples of the condensation crosslinking agent for a carboxy group (C) in the present invention include glycidyl ether compounds such as ethyleneglycol diglycidyl ether, trimethylolpropane triglycidyl ether, (poly)glycerin polyglycidyl ether, diglycerin polyglycidyl ether, and propylene glycol diglycidyl ether; polyhydric alcohols such as (poly)glycerin, (poly)ethylene glycol, propylene glycol, 1,3-propanediol, polyoxyethylene glycol, triethylene glycol, tetraethylene glycol, diethanolamine, and triethanolamine; polyvalent amines such as ethylenediamine, diethylenediamine, polyethyleneimine, and hexamethylenediamine; and the like. Monomers in which polyvalent ions such as zinc, calcium, magnesium, and aluminum are condensed can be similarly used. These crosslinking agents may be used in combination of two or more.

The addition amount of the condensation crosslinking agent (C) is generally from 0.01 to 20% by weight, preferably from 0.05 to 5% by weight, and further preferably from 0.1 to 3% by weight, based on the weight of all the polymerizable monomers.

The crosslinking agent polymerizable with unsaturated monomers (D) in the present invention refers to a compound which has two or more unsaturated groups and/or reactive groups in a molecule which acts as a crosslinking agent during polymerization. It is a polymerizable crosslinking agent and is copolymerizable with unsaturated carboxylic acid monomers. It is possible to crosslink between the polymer molecular chains of the water-absorbing resin, so that the water-absorbing resin can be crosslinked to the internal part thereof to be insolubilized to water. Use of a crosslinking agent polymerizable with unsaturated monomers which has a high hydrophilicity is preferred because the water absorption performance of the resulting resin can be improved. Examples of the crosslinking agent polymerizable with unsaturated monomers include diethyleneglycol diacrylate, N,N'-methylenebisacrylamide, polyethyleneglycol diacrylate, polypropyleneglycol diacrylate, trimethylolpropane diallyl ether, ally glycidyl ether, pentaerythritol triallyl ether, pentaerythritol diacrylate monostearate, bisphenol diacrylate, isocyanuric acid diacrylate, tetraallyloxyethane, diallyloxyacetate, and the like. These crosslinking agents may be used in combination of two or more. The addition amount of the crosslinking agent polymerizable with unsaturated monomers (D) is preferably from 0.005 to 5 mol %, more preferably from 0.01 to 3 mol %, and most preferably from 0.01 to 2 mol %, based on all the polymerizable monomers. An inadequate amount of usage of the crosslinking agent polymerizable with unsaturated monomers (D) is not preferred because of the reduction in water absorption performance of the water-absorbing resin to be produced.

"About the Polymerization of Monomers"

The solvent for the monomer solution is not particularly limited as long as it is excellent in solubility. The most preferred solvent is the water that is used singly, but a hydrophilic solvent such as ethanol, methanol, acetone, dimethylformamide, dimethylsulfoxide, or the like may be used singly or in combination of two or more. In addition, salts such as sodium chloride, basic compounds such as ammonia for the purpose of controlling pH, or a suspending agent for reverse-phase suspension polymerization may optionally be added.

When the monomer solution is subjected to polymerization, it may be mixed with a water-soluble chain transfer agent such as hypophosphites, thiols, or thiol acids, and a hydrophilic polymer such as starch, cellulose, polyvinyl alcohol, polyacrylic acid, or crosslinked polyacrylates. The amount of the water-soluble chain transfer agent and the hydrophilic polymer used here is generally within 5 parts by weight and 50 parts by weight, respectively, based on 100 parts by weight of all the polymerizable monomers.

The method of polymerizing unsaturated monomers is not particularly limited, but a method used generally and widely such as (aqueous) solution polymerization, reverse-phase suspension polymerization, spray polymerization, or belt polymerization may be applied to it.

The method of initiating polymerization is also not particularly limited, but it includes ionic polymerization including anionic polymerization, polymerization with a radical polymerization initiator, polymerization by irradiation of radiation, electron beams or the like, and ultraviolet light polymerization using a photosensitizer. Examples of initiators used for radical polymerization include known initiators including persulfates such as potassium persulfate, ammonium persulfate, and sodium persulfate; hydrogen peroxide; organic peroxides such as cumene hydroperoxide, t-butyl hydroperoxide, and peracetic acid; and the like. When an oxidative radical polymerization initiator is used, a reducing agent such as L-ascorbic acid or sodium hydroxymethanesulfinate dihydrate (trade name: Rongalite, manufactured by Wako Pure Chemical Industries, Ltd.) can be used in combination. One type of initiator may be used singly, or two or more types of initiators may be used in combination. Furthermore, phosphine, alkali hydroxides, alkoxides, tetraalkylammonium salts, ammonia, or the like may be used as an initiator in anionic polymerization.

Preferably, deoxidation operation for the monomer solution is performed in advance before the initiation of polymerization. Specific methods include a method of removing dissolved oxygen by bubbling inert gas for a sufficient period of time. Further, an atmosphere inside the reactor is preferably replaced by inert gas such as nitrogen or helium.

The polymerization reactor may be operated at reduced, normal or increased pressure. The polymerization is initiated at a temperature typically from 0 to 50° C., preferably from 10 to 40° C. The temperature in the reactor during polymerization may be allowed to take its course or may be controlled by cooling or heating the reactor from the outside. The concentration of monomers in the monomer solution is preferably from 10 to 70%, most preferably from 30 to 50% from economical point of view and in terms of ease of reaction control.

"About Crushing, Drying, and Milling after Polymerization"

A water-containing gel-like material is formed after polymerization. In the case of aqueous solution polymerization or belt polymerization, the resin is formed into particles by crushing the water-containing gel-like material to a size of several millimeters, drying the crushed material, and then milling the dried material to a size of several hundred micrometers. Alternatively, the water-containing gel is crushed and milled simultaneously to a size that may be the optimum particle size after drying, and then the milled gel is dried. The particle size is preferably in the range of from 40 µm to 3,000 µm, more preferably from 50 µm to 2,000 µm, and most preferably from 100 µm to 1,500 µm. The milling method is not particularly limited, but conventionally known methods may be optionally used. In the case of reverse-phase suspension polymerization, the dried resin is sieved to an appropriate size. The classification method is not particularly limited as long as it is a known method, but it includes a method using a sieve, a wet classification method, and the like.

The drying method is not particularly limited, but vacuum drying or hot-air drying is typically used. The drying temperature is preferably in the range of from 70° C. to 180° C., more preferably from 90 to 140° C. The temperature can be raised stepwise. An excessively low drying temperature is not economical because it takes too long to dry, and an excessively high drying temperature may lead to reduction in absorption performance due to the decomposition of the water-absorbing resin.

The shape of the resin is not particularly limited, but in any case, the shape is desirably completed before the resin is subjected to heat treatment.

"About Heat Treatment"

A preferred method for reducing the carboxy group neutralization ratio on the external surface of the resin to a level lower than that in the internal part thereof is the heat treatment which is performed for the purpose of removing counter cations at the external surface portion of the resin obtained by the production method as described above. The heat treatment may be performed after the completion of drying continuously in the same apparatus or may be a step in an apparatus separated from the drying step. Heating conditions are not particularly limited unless they deteriorate the water absorption performance of the resin, but they are optionally selected depending on the core-shell structure and the thickness of the skin structure to be formed. The heating temperature is in the range of from 100 to 250° C., preferably from 120 to 200° C. Further, the heat treatment is preferably performed at a heating temperature higher than the drying temperature by 10 to 150° C. in terms of the core-shell structure in the resin and the water absorption performance, more preferably higher than the drying temperature by 30 to 100° C. The heating time is from one minute to five hours. The heating temperature and the heating time as described above are optionally selected so that the carboxy group neutralization ratio in the central part of the resin is 60 mol % or more and that on the external surface thereof is 50 mol % or less. The heat-treatment apparatus is not particularly limited, but known apparatuses such as a hot-air dryer, a fluidized-bed dryer, a Nauta dryer, and the like are used.

The water-absorbing resin of the present invention has achieved high water-absorption capacity both under no pressure and under pressure and is suitable for use in sanitary material applications and the like. Moreover, the production method of the present invention can produce a water-absorbing resin which achieves high water-absorption capacity both under no pressure and under pressure by a simple method.

EXAMPLES

Specific examples of the present invention and comparative examples thereof are described below, but the present invention is not limited to the following examples.

(1) Method for Measuring the Carboxy Group Neutralization Ratio on the External Surface of the Resin and that in the Internal Part Thereof (i) Measurement Equipment As the measurement equipment, FTS-575 manufactured by Bio-Rad Company was used.

(ii) Measurement Conditions

Microscopic ATR spectroscopy (crystal plate of Ge, reflection of one time),
Background: Air, measurement at normal temperature,
Aperture: 50×50 µm,
Integration numbers: 100 times The peak area ratio of 1,695 cm$^{-1}$ ($\nu$C=O of carboxylic acids, base line 1,774-1,616 cm$^{-1}$) to 1,558 cm$^{-1}$ ($\nu$COO— of carboxylates, base line 1,616-1,500 cm$^{-1}$) (1,695/1,558 cm$^{-1}$) is determined from the spectrum data obtained by the measurement.

(iii) Preparation of the Calibration Curve

Partially crosslinked polyacrylic acids which are prepared by neutralizing 10 mol %, 30 mol %, 50 mol %, 70 mol %, 90 mol %, and 100 mol % of all the carboxylic acids with ammonia were used as the samples for preparing the calibration curve. The samples for preparing the calibration curve were cut, and the central part thereof was measured by the microscopic ATR spectroscopy 5 times per sample. The calibration curve (quintic polynomial approximation curve) was prepared from the —COOH/—COO— peak area ratio. The cutting was carried out by using an ultramicrotome (ULTRACUT N, manufactured by Reichert Company).

(iv) Measurement of the Samples

The measurement of the samples was carried out in the same manner as in the case of the samples for the calibration curve. The external surface of the resin was directly measured by the ATR method, and the central part of the resin was cut by the ultramicrotome and then measured by the ATR method. The external surface of the resin was measured 3 times per sample and the central part of the resin was measured 5 times per sample, the average of the measurement values being the measurement results.

(2) Measurement of the Thickness of the Skin Structure; IR Imaging Measurement (i) Pretreatment The resin was cut with the ultramicrotome (ULTRACUT N, manufactured by Reichert Company) so that the central part of the resin can be measured, preparing a section having a thickness of about 2 µm. The section was fixed on a NaCl crystal plate smoothly and set on the microscopic IR imaging measurement equipment.

(ii) Measurement Equipment

The IR imaging measurement was performed according to the microscopic transmission method by using Spot-Light manufactured by Perkin Elmer Corp.

(iii) Measurement Conditions

Measurement spot diameter: 6.25×6.25 µm,
Integration numbers: 4 times,
Measurement atmosphere: Dry air; and
Measurement was performed within 30 minutes after pretreatment.

(iv) Analysis of IR Spectra

The peak area ratio of 1,695 cm$^{-1}$ ($\nu$C=O of carboxylic acids, base line 1,774-1,616 cm$^{-1}$) to 1,558 cm$^{-1}$ ($\nu$COO— of carboxylates, base line 1,616-1,500 cm$^{-1}$) (1,695/1,558 cm$^{-1}$) was calculated from the spectrum data obtained by the measurement to convert the total absorbance image to the band ratio image, thereby verifying that all the external surfaces of the measurement, samples had a lower carboxy group neutralization ratio than that in the internal part thereof. Further, a line profile was taken in the sectional direction of the band ratio image to measure the distance from the external surface to the point where the band ratio value thereof is lower than that of the external surface by 40%. The distance was defined as the thickness of the skin structure.

(3) Measurement Method of Water-Absorption Performance; Water-Absorption Under Pressure In a cylindrical tool made of acrylic resin with a nylon net of 250 mesh provided at the bottom (outer diameter: 35.0 mm, inner diameter: 24.5 mm, height: 30 mm, weight: D (g)), is charged a water-absorbing resin having a weight of E (g) (which is about 0.16 g) such that it is uniformly distributed in the tool. Although no weight is placed at 0.0 psi, a weight (having an outer diameter of 24.5 mm) of 99.3 g is placed on the tool at 0.3 psi, and a weight of 278.3 g is placed at 0.8 psi. Physiological saline in an amount of 60 cm³ is charged in a stainless steel petri dish (inner diameter: 120 mm), and the cylindrical tool is placed in the petri dish for one hour. After the elapse of a predetermined period of time, excessive water is removed with a paper towel, and then the total weight F (g) including the tool and the weight is measured with a balance. The water-absorption capacity is determined by the following equation:

Water-absorption capacity $(g/g)=(F(g)-D(g)-\text{weight of the weight }(g))/E(g)$ (4) Measurement Method of Water-Absorption Performance; Tea-Bag Method In a tea-bag type bag (7×9 cm) made of nonwoven fabric, is charged a water-absorbing resin having a weight of A (g) (which is about 0.5 g) such that it is uniformly distributed in the bag. Then, the bag is immersed in 500 cm³ of physiological saline having a liquid temperature of 25° C. for one hour. After the elapse of a predetermined period of time, the tea-bag type bag is taken out and left to stand for 10 minutes for draining. Then, the weight of bag, B (g), is measured. The same operation is performed as the reference by using only the tea-bag type bag without charging the water-absorbing resin, and the weight C (g) is measured. The water-absorption capacity is determined by the following equation:

Water-absorption capacity $(g/g)=(B(g)-C(g))/A(g)$

Production Example 1

Preparation of Ammonium Acrylate by Neutralizing Acrylic Acid

Acrylic acid of guaranteed reagent grade manufactured by Wako Pure Chemical Industries, Ltd. was used. In 91.02 g of water, was dissolved 100 g of the reagent acrylic acid. The aqueous solution was cooled in an ice bath, and 117.94 g of a 25% by weight aqueous ammonia solution was slowly added to the aqueous solution with stirring while keeping the liquid temperature at 30° C. or lower, obtaining a 40% by weight aqueous ammonium acrylate solution.

Production Example 2

Preparation of Ammonium Acrylate by Hydrolyzing Acrylonitrile (1) Preparation of a Biocatalyst

*Acinetobacter* sp. AK 226 (FERM BP-08590) having nitrilase activity was aerobically cultured at 30° C. by adding 0.5% by weight of acetonitrile as a source of nutrient in a culture medium of an aqueous solution adjusted to pH=7 which contains 0.1% of sodium chloride, 0.1% of potassium dihydrogenphosphate, 0.05% of magnesium sulfate heptahydrate, 0.005% of iron sulfate heptahydrate, 0.005% of manganese sulfate pentahydrate, 0.1% of ammonium sulfate, and 0.1% of potassium nitrate (all % by weight). The resulting mixture was washed with a 30 mM phosphate buffer (pH=7) to obtain a cell suspension (15% by weight of a dried cell). Subsequently, a mixture of acrylamide, N,N'-methylenebisacrylamide, an aqueous N,N,N',N'-tetramethylethylenediamine solution of 5%, the cell suspension, and the 30 mM phosphate buffer was mixed with an aqueous potassium persulfate solution of 2.5% to obtain a polymer. The final solution was composed of 3% of the dried cell, 52% of the 30 mM phosphate buffer (pH=7), 18% of acrylamide, 1% of methylenebisacrylamide, 12% of the 5% aqueous N,N,N',N'-tetramethylethylenediamine solution, and 14% of the 2.5% aqueous potassium persulfate solution (all % by weight). The polymer was cut to particles each having a size of about 1×3×3 mm per side to obtain an immobilized cell. The immobilized cell was washed with a 30 mM phosphate buffer (pH=7) to prepare an immobilized cell catalyst (hereinafter referred to as a biocatalyst).

(2) Hydrolysis with a Biocatalyst

To an Erlenmeyer flask having an internal volume of 500 ml, 400 g of distilled water was charged. A wire basket with 1 g of the above-described biocatalyst (corresponding to 0.03 g of the dried cell) therein was placed in the distilled water. The flask was sealed with a rubber stopper and immersed in a constant-temperature water bath. The distilled water was kept at a temperature of 20° C. and agitated with a stirrer.

Reaction for accumulation of ammonium acrylate was performed by intermittently feeding 2% by weight of acrylonitrile each time (the concentration of acrylonitrile was controlled at 0.5% by weight or more), and as a result, it was possible to accumulate ammonium acrylate up to 30% by weight.

The resulting aqueous ammonium acrylate solution was colorless and transparent. Moreover, 5 L of the reaction mixture was prepared under the same conditions and purified through a UF membrane (Pencil-type module SIP-0013 from Asahi Kasei). It was possible to treat all of the reaction mixture without clogging, obtaining a high-purity aqueous ammonium acrylate solution of 30% by weight. The aqueous solution was mixed with 200 ppm of methoxyquinone and concentrated to 40% by weight for use in polymerization while shielding the light under reduced pressure.

Production Example 3

Preparation of Sodium Acrylate by Neutralizing Acrylic Acid

Acrylic acid of guaranteed reagent grade manufactured by Wako Pure Chemical Industries, Ltd. was used. In 81.6 g of water, was dissolved 100 g of the reagent acrylic acid. The aqueous solution was cooled in an ice bath, and 137.1 g of a 40.5% by weight aqueous NaOH solution was slowly added to the aqueous solution with stirring while keeping the liquid temperature at 30° C. or lower, obtaining a 40% by weight aqueous sodium acrylate solution.

Example 1

To a 300 ml separable flask, were added 90 g of the 40% by weight aqueous ammonium acrylate solution from Production Example 1 and 0.0187 g of N,N'-methylenebisacrylamide. The flask was immersed in a water bath so that the internal temperature of the aqueous solution was kept at 30° C. The aqueous solution was bubbled with nitrogen gas to remove air, replacing the air in the reaction system with nitrogen. Next, 0.86 g of a 42% by weight aqueous glycerin solution was added to the aqueous solution with a syringe. After the aqueous solution was thoroughly agitated, 0.0917 g of a 30% weight aqueous hydrogen peroxide solution and 0.0415 g of sodium hydroxymethanesulfinate dihydrate (trade name: Rongalite, manufactured by Wako Pure Chemical Industries, Ltd., hereinafter referred to as Rongalite), each being dissolved in 1 g of water, were added to the aqueous solution to start polymerization. The temperature of the solution starting from 30° C. rose to 100° C. in 10 minutes after the start of the reaction. Then, the solution was heated for 3 hours in a water bath so that the internal temperature was kept at 70° C., thereby forming a gel. Then, the gel was removed from the separable flask, roughly crushed and then dried at 100° C. using a vacuum dryer. After the completion of drying, the dried gel was milled by a homogenizer and sieved to collect a milled gel having a particle size of from 100 to 850 μm. The collected gel was heated at 180° C. for 15 minutes under a nitrogen atmosphere in an inert oven. The water-absorbing resin obtained as described above was named as a water-absorbing resin (1).

The results of measurement of carboxy group neutralization ratio on the external surface of the resin and the carboxy group neutralization ratio in the central part of the resin and the results of measurement of water absorption of the water-absorbing resin (1) are shown in Table 1.

Example 2

To a 300 ml separable flask, were added 90 g of the 40% by weight aqueous ammonium acrylate solution from Production Example 1 and 0.0187 g of N,N'-methylenebisacrylamide. The flask was immersed in a water bath so that the internal temperature of the aqueous solution was kept at 30° C. The aqueous solution was bubbled with nitrogen gas to remove air, replacing the air in the reaction system with nitrogen. Next, 0.86 g of a 42% by weight aqueous glycerin solution was added to the aqueous solution with a syringe. After the aqueous solution was thoroughly agitated, 0.0917 g of a 30% weight aqueous hydrogen peroxide solution and 0.0415 g of Rongalite, each being dissolved in 1 g of water, were added to the aqueous solution to start polymerization. The temperature of the solution starting from 30° C. rose to 70° C. in 10 minutes after the start of the reaction. Then, the solution was heated for 3 hours in a water bath so that the internal temperature was kept at 70° C., thereby forming a gel. Then, the gel was removed from the separable flask, roughly crushed and then dried at 100° C. using a vacuum dryer. After the completion of drying, the dried gel was milled by a homogenizer and sieved to collect a milled gel having a particle size of from 100 to 850 μm. The collected gel was heated at 170° C. for 30 minutes under a nitrogen atmosphere in an inert oven. The thus obtained water-absorbing resin was named as a water-absorbing resin (2).

The results of measurement of carboxy group neutralization ratio on the external surface of the resin and the carboxy group neutralization ratio in the central part of the resin, the results of measurement of the thickness of the skin structure determined by IR imaging, and the results of measurement of water absorption of the water-absorbing resin (2) are shown in Table 1. Further, a photomicrograph of a sample subjected to IR imaging is shown in FIG. 1, and a line profile result obtained by digitizing the 1,695/1,558 $cm^{-1}$ peak area ratio taken along the broken line of FIG. 1 in the IR imaging measurement is shown in FIG. 2.

Example 3

To a 300 ml flask, were slowly added 97.66 g of a reagent acrylic acid (guaranteed reagent grade manufactured by Wako Pure Chemical Industries, Ltd.), 126.55 g of water, and 81.35 g of a 25% by weight aqueous ammonia while cooling the solution on ice so that the temperature of the solution does not exceed 30° C. The solution was further mixed with 7.8 g of activated carbon and stirred for one hour while shielding the light. The resulting solution was filtered to remove the activated carbon to form a 90% neutralized aqueous ammonium acrylate solution.

To a 300 ml separable flask, were added 90 g of the 90% neutralized aqueous ammonium acrylate solution and 0.0198 g of N,N'-methylenebisacrylamide. The flask was immersed in a water bath so that the internal temperature of the aqueous solution was kept at 30° C. The aqueous solution was bubbled with nitrogen gas to remove air, replacing the air in the reaction system with nitrogen. Next, 0.86 g of a 42% by weight aqueous glycerin solution was added to the aqueous solution with a syringe. After the aqueous solution was thoroughly agitated, 0.0953 g of a 30% weight aqueous hydrogen peroxide solution and 0.0419 g of Rongalite, each being dissolved in 1 g of water, were added to the aqueous solution to start polymerization. The temperature of the solution starting from 30° C. rose to 102° C. after 5 minutes from the start of the reaction. Then, the solution was heated for 3 hours in a water bath so that the internal temperature was kept at 70° C., thereby forming a gel. Then, the gel was removed from the separable flask, roughly crushed and then dried at 100° C. for 4 hours using an inert oven with a nitrogen atmosphere. After the completion of drying, the dried gel was milled by a homogenizer and sieved to collect a milled gel having a particle size of from 100 to 850 μm. The collected gel was heated at 170° C. for 30 minutes under a nitrogen atmosphere in an inert oven. The thus obtained water-absorbing resin was named as a water-absorbing resin (3).

The results of measurement of carboxy group neutralization ratio on the external surface of the resin and the carboxy group neutralization ratio in the central part of the resin and the results of measurement of water absorption of the water-absorbing resin (3) are shown in Table 1.

Example 4

To a 300 ml flask, were slowly added 88.64 g of a reagent acrylic acid (guaranteed reagent grade manufactured by Wako Pure Chemical Industries, Ltd.), 107.05 g of water, and 57.43 g of a 25% by weight aqueous ammonia while cooling the solution on ice so that the temperature of the solution does not exceed 30° C. The solution was further mixed with 7.1 g of activated carbon and stirred for one hour while shielding the light. The resulting solution was filtered to remove the activated carbon to form a 70% neutralized aqueous ammonium acrylate solution.

To a 300 ml separable flask, were added 90 g of the 70% neutralized aqueous ammonium acrylate solution and 0.0198 g of N,N'-methylenebisacrylamide. The flask was immersed in a water bath so that the internal temperature of the aqueous solution was kept at 30° C. The aqueous solution was bubbled with nitrogen gas to remove air, replacing the air in the reaction system with nitrogen. Next, 0.86 g of a 42% by weight aqueous glycerin solution was added to the aqueous solution with a syringe. After the aqueous solution was thoroughly agitated, 0.0953 g of a 30% weight aqueous hydrogen peroxide solution and 0.0419 g of Rongalite, each being dissolved in 1 g of water, were added to the aqueous solution to start polymerization. The temperature of the solution starting from 30° C. rose to 105° C. after 5 minutes from the start of the reaction. Then, the solution was heated for 3 hours in a water bath so that the internal temperature was kept at 70° C., thereby forming a gel. Then, the gel was removed from the separable flask, roughly crushed and then dried at 100° C. for 4 hours using an inert oven with a nitrogen atmosphere. After the completion of drying, the dried gel was milled by a homogenizer and sieved to collect a milled gel having a particle size of from 100 to 850 μm. The collected gel was heated at 170° C. for 20 minutes under a nitrogen atmosphere in an inert oven. The thus obtained water-absorbing resin was named as a water-absorbing resin (4).

The results of measurement of carboxy group neutralization ratio on the external surface of the resin and the carboxy group neutralization ratio in the central part of the resin and the results of measurement of water absorption of the water-absorbing resin (4) are shown in Table 1.

Example 5

To a 300 ml separable flask, were added 19.6 g of acrylic acid, 15.2 g of water, and 8.7 g of a 28% by weight of aqueous ammonia solution. The flask was immersed in a water bath so that the internal temperature of the aqueous solution was kept at 30° C. The aqueous solution was bubbled with nitrogen gas to remove oxygen, replacing the oxygen in the reaction system with nitrogen. Next, 3.1 g of a 64% by weight aqueous glycerin solution was added to the aqueous solution with a syringe. After the aqueous solution was thoroughly agitated, 0.0413 g of ammonium persulfate and 0.0005 g of L-ascorbic acid, each being dissolved in 1 g of water, were added to the aqueous solution to start polymerization. The temperature of the solution starting from 30° C. rose to 75° C. in 5 minutes after the start of the reaction. 5 minutes after reaching the maximum temperature, the solution was heated for 3 hours in a water bath so that the internal temperature was kept at 75° C., thereby forming a gel. After the elapse of a predetermined period of time, the gel was removed from the separable flask, roughly crushed and then dried at 100° C. using a vacuum dryer. After the completion of drying, the dried gel was milled by a homogenizer and sieved to collect a milled gel having a particle size of from 100 to 850 μm. The collected gel was heated at 150° C. for 5 hours under a nitrogen atmosphere in an inert oven. The water-absorbing resin obtained as described above was named as a water-absorbing resin (5). The results of measurement of water absorption of the water-absorbing resin (5) are shown in Table 2.

Example 6

To a 300 ml separable flask, were added 90 g of the 40% by weight aqueous ammonium acrylate solution from Production Example 1 and 0.0250 g of ethyleneglycol dimethacrylate. The flask was immersed in a water bath so that the internal temperature of the aqueous solution was kept at 30° C. The aqueous solution was bubbled with nitrogen gas to remove oxygen, replacing the oxygen in the reaction system with nitrogen. Next, 2.1 g of a 50% by weight aqueous glycerin solution was added to the aqueous solution with a syringe. After the aqueous solution was thoroughly agitated, 0.0917 g of a 30% by weight aqueous hydrogen peroxide solution and 0.0415 g of Rongalite, each being dissolved in 1 g of water, were added to the aqueous solution to start polymerization. The temperature of the solution starting from 30° C. rose to 100° C. in 10 minutes after the start of the reaction. 5 minutes after reaching the maximum temperature, the solution was heated for 3 hours in a water bath so that the internal temperature was kept at 75° C., thereby forming a gel. After the elapse of a predetermined period of time, the gel was removed from the separable flask, roughly crushed and then dried at 100° C. using a vacuum dryer. After the completion of drying, the dried gel was milled by a homogenizer and sieved to collect a milled gel having a particle size of from 100 to 850 μm. The collected gel was heated at 150° C. for 60 minutes under a nitrogen atmosphere in an inert oven. The water-absorbing resin obtained as described above was named as a water-absorbing resin (6). The results of measurement of water absorption of the water-absorbing resin (6) are shown in Table 2.

Example 7

To a 300 ml separable flask, were added 90 g of the 40% by weight aqueous ammonium acrylate solution from Production Example 1 and 0.0248 g of ethyleneglycol dimethacrylate. The flask was immersed in a water bath so that the internal temperature of the aqueous solution was kept at 30° C. The aqueous solution was bubbled with nitrogen gas to remove oxygen, replacing the oxygen in the reaction system with nitrogen. Next, 0.72 g of a 50% by weight aqueous ethyleneglycol solution was added to the aqueous solution with a syringe. After the aqueous solution was thoroughly agitated, 0.0615 g of ammonium persulfate and 0.0007 g of L-ascorbic acid, each being dissolved in 1 g of water, were added to the aqueous solution to start polymerization. The temperature of the solution starting from 30° C. rose to 70° C. in 10 minutes after the start of the reaction. 5 minutes after reaching the maximum temperature, the solution was heated for 3 hours in a water bath so that the internal temperature was kept at 75° C., thereby forming a gel. After the elapse of a predetermined period of time, the gel was removed from the separable flask, roughly crushed and then dried at 100° C. using a vacuum dryer. After the completion of drying, the dried gel was milled by a homogenizer and sieved to collect a milled gel having a particle size of from 100 to 850 μm. The collected gel was heated at 170° C. for 30 minutes under a nitrogen atmosphere in an inert oven. The water-absorbing resin obtained as described above was named as a water-absorbing resin (7). The results of measurement of water absorption of the water-absorbing resin (7) are shown in Table 2.

Example 8

To 90 g of a 40% by weight aqueous ammonium acrylate solution obtained from the biocatalyst in Production Example 2, was added and dissolved 0.0187 g of N,N'-methylenebisacrylamide as a crosslinking agent. The solution was transferred to a 300 ml separable flask and purged with nitrogen at 30° C. for 30 minutes while being stirred. To the resulting solution, were in turn added 0.414 g of diethylene glycol, 0.414 g of Rongalite, and then 0.092 g of a 30% by weight aqueous hydrogen peroxide solution to start polymerization. The temperature started to rise 5 minutes after the start of polymerization and reached a maximum temperature of 100° C. After performing polymerization for one hour, a water-containing gel was obtained. The water-containing gel was crushed to a size of about 5 mm per side and dried at 100° C. for 2 hours in an inert oven under a nitrogen atmosphere. The dried polymer was milled by a homogenizer and then further dried at 100° C. for 2 hours in an inert oven. The dried polymer was classified into particles having a particle size of 106 to 850 μm, followed by heating at 170° C. for 30 minutes. The water-absorbing resin obtained as described above was named as a water-absorbing resin (8). The results of measurement of water absorption of the water-absorbing resin (8) are shown in Table 2.

Example 9

To 90 g of a 40% by weight aqueous ammonium acrylate solution obtained from the biocatalyst in Production Example 2, was added and dissolved 0.0187 g of N,N'-methylenebisacrylamide as a crosslinking agent. The solution was transferred to a 300 ml separable flask and purged with nitrogen at 30° C. for 30 minutes while being stirred. To the resulting solution, were in turn added 0.587 g of triethylene glycol, 0.414 g of Rongalite, and then 0.092 g of a 30% by weight aqueous hydrogen peroxide solution to start polymerization. The temperature started to rise 3 minutes after the start of polymerization and reached a maximum temperature of 105° C. After performing polymerization for one hour, a water-containing gel was obtained. The water-containing gel was crushed to a size of about 5 mm per side and dried at 100° C. for 2 hours in an inert oven under a nitrogen atmosphere. The dried polymer was milled by a homogenizer and then further dried at 100° C. for 2 hours in an inert oven. The dried polymer was classified into particles having a particle size of 106 to 850 μm, followed by heating at 170° C. for 30 minutes. The water-absorbing resin obtained as described above was named as a water-absorbing resin (9). The results of measurement of water absorption of the water-absorbing resin (9) are shown in Table 2.

Example 10

To 90 g of a 40% by weight aqueous ammonium acrylate solution obtained from the biocatalyst in Production Example 2, was added and dissolved 0.0187 g of N,N'-methylenebisacrylamide as a crosslinking agent. The resulting solution was transferred to a 300 ml separable flask and purged with nitrogen at 30° C. for 30 minutes while being stirred. To the resulting solution, were in turn added 0.263 g of erythritol, 0.414 g of Rongalite, and then 0.092 g of a 30% by weight aqueous hydrogen peroxide solution to start polymerization. The temperature started to rise one minute after the start of polymerization and reached a maximum temperature of 102° C. After performing polymerization for one hour, a water-containing gel was obtained. The water-containing gel was crushed to a size of about 5 mm per side and dried at 100° C. for 2 hours in an inert oven under a nitrogen atmosphere. The dried polymer was milled by a homogenizer and then further dried at 100° C. for 2 hours in an inert oven. The dried polymer was classified into particles having a particle size of 106 to 850 μm, followed by heating at 170° C. for 30 minutes. The water-absorbing resin obtained as described above was named as a water-absorbing resin (10). The results of measurement of water absorption of the water-absorbing resin (10) are shown in Table 2.

Example 11

To a 300 ml flask, were slowly added 118.18 g of a reagent acrylic acid (guaranteed reagent grade manufactured by Wako Pure Chemical Industries, Ltd.), 168.51 g of water, 16.03 g of a 30% by weight aqueous NaOH solution, and 109.38 g of a 25% by weight aqueous ammonia while cooling the solution on ice so that the temperature of the solution does not exceed 30° C.

To a 300 ml separable flask, were added 90 g of the above-described aqueous monomer solution and 0.0378 g of N,N'-methylenebisacrylamide. The flask was immersed in a water bath so that the internal temperature of the solution was kept at 30° C. The aqueous solution was bubbled with nitrogen gas to remove air, replacing the air in the reaction system with nitrogen. Next, 0.86 g of a 42% by weight aqueous glycerin solution was added to the aqueous solution with a syringe. After the aqueous solution was thoroughly agitated, 0.0953 g of a 30% by weight aqueous hydrogen peroxide solution and 0.0419 g of Rongalite, each being dissolved in 1 g of water, were added to the aqueous solution to start polymerization. The temperature of the solution starting from 30° C. rose to 105° C. after 5 minutes from the start of the reaction. Then, the solution was heated for 3 hours in a water bath so that the internal temperature was kept at 70° C., thereby forming a gel. Then, the gel was removed from the separable flask, roughly crushed and then dried at 100° C. for 4 hours using an inert oven with a nitrogen atmosphere. After the completion of drying, the dried gel was milled by a homogenizer and sieved to collect a milled gel having a particle size of from 100 to 850 μm. The collected gel was heated at 170° C. for 30 minutes under a nitrogen atmosphere in an inert oven. The thus obtained water-absorbing resin was named as a water-absorbing resin (11).

The results of measurement of water absorption of the water-absorbing resin (11) are shown in Table 2.

Comparative Example 1

To a 300 ml separable flask, were added 171.13 g of a 40% by weight aqueous ammonium acrylate solution from Production Example 1, 18.53 g of acrylic acid, and 35.34 g of water to obtain a 38% by weight aqueous ammonium acrylate/acrylic acid=75/25 solution, which was then mixed with 7.8 g of activated carbon and stirred for one hour while shielding the light. The resulting solution was filtered to remove the activated carbon, followed by adding and dissolving 0.0968 g of trimethylolpropane triacrylate as a crosslinking agent. To a 300 ml separable flask, was transferred 90 g of the solution, which was then purged with nitrogen at 30° C. for 30 minutes under stirring. To the resulting solution, was added 0.018 g of sodium hydrogen sulfite and then 0.0276 g ammonium persulfate. Polymerization was performed for one hour to obtain a polymer, which was then crushed to about 5 mm and dried at 150° C. for one hour in an inert oven with a nitrogen atmosphere. The dried polymer was milled by a homogenizer and then classified into particles having a particle size of 106 to 850 μm. The classified polymer in an amount of 100 parts was mixed with 2 parts of propylene glycol, 3 parts of water, and 30 parts of isopropyl alcohol, followed by heat treatment at 150° C. for 60 minutes. The resin obtained as described above was named as a comparative water-absorbing resin (1).

The results of measurement of carboxy group neutralization ratio on the external surface of the resin and the carboxy group neutralization ratio in the central part of the resin, the results of measurement of the thickness of the skin structure determined by IR imaging, and the results of measurement of water absorption of the comparative water-absorbing resin (1) are shown in Table 1.

Comparative Example 2

In 52.96 g of water, was dissolved 28.32 g of a reagent acrylic acid (guaranteed reagent grade manufactured by Wako Pure Chemical Industries, Ltd.). The resulting solution was cooled in an ice bath and slowly mixed with 18.35 g of a 25% by weight aqueous ammonia solution under stirring while keeping the mixture at a temperature of 30° C. or lower to obtain a 40% by weight aqueous ammonium acrylate/acrylic acid=70/30 solution. The aqueous ammonium acrylate/acrylic acid=70/30 solution in an amount of 90 g was brought to 10° C. and purged with nitrogen for 30 minutes, followed by addition of 0.72 g of ammonium carbonate and 0.147 g of triallylamine. To the resulting solution, were added as an initiator 0.1387 g of ammonium persulfate, 0.0322 g of a 30% by weight aqueous hydrogen peroxide solution, and 0.0016 g L-ascorbic acid. Polymerization was performed for one hour to obtain a polymer, which was then crushed and dried at 120° C. for 2 hours in an inert oven with a nitrogen atmosphere. After drying, 100 parts of the polymer was mixed with 0.25 parts of ethyleneglycol diglycidyl ether, 2 parts of water, and 2 parts of ethanol, followed by heat treatment at 120° C. for 60 minutes. The resin obtained as described above was named as a comparative water-absorbing resin (2).

The results of measurement of carboxy group neutralization ratio on the external surface of the resin and the carboxy group neutralization ratio in the central part of the resin, the results of measurement of the thickness of the skin structure determined by IR imaging, and the results of measurement of water absorption of the comparative water-absorbing resin (2) are shown in Table 1.

Comparative Example 3

In 52.96 g of water, was dissolved 28.32 g of a reagent acrylic acid (guaranteed reagent grade manufactured by Wako Pure Chemical Industries, Ltd.). The resulting solution was cooled in an ice bath and slowly mixed with 18.35 g of a 25% by weight aqueous ammonia solution under stirring while keeping the mixture at a temperature of 30° C. or lower to obtain a 40% by weight aqueous ammonium acrylate/acrylic acid=70/30 solution. The aqueous ammonium acrylate/acrylic acid=70/30 solution in an amount of 90 g was brought to 10° C. and purged with nitrogen for 30 minutes, followed by addition of 0.72 g of ammonium carbonate and 0.147 g of triallylamine. To the resulting solution, were added as an initiator 0.1387 g of ammonium persulfate, 0.0322 g of a 30% by weight aqueous hydrogen peroxide solution, and 0.0016 g of L-ascorbic acid. Polymerization was performed for one hour to obtain a polymer, which was then crushed and dried at 150° C. for one hours in an inert oven with a nitrogen atmosphere. After drying, the polymer was further dried at 170° C. for 30 minutes in an inert oven with a nitrogen atmosphere. The resin obtained as described above was named as a comparative water-absorbing resin (3). The results of measurement of water absorption of the comparative water-absorbing resin (3) are shown in Table 2.

Comparative Example 4

In 13.35 g of water, was dissolved 67.75 g of an aqueous sodium acrylate solution obtained in Production Example 3. The resulting solution was mixed with 8.9 g of acrylic acid to obtain 90 g of a 40% by weight aqueous sodium acrylate/acrylic acid=70/30 solution, to which 0.0992 g of N,N'-methylenebisacrylamide was added and dissolved as a crosslinking agent. The resulting solution was transferred to a 300 ml separable flask and purged with nitrogen at 30° C. for 30 minutes while being stirred. Polymerization was started by adding 0.0007 g of L-ascorbic acid and 0.046 g of ammonium persulfate, each being dissolved in 1 g of water, to the solution. After performing polymerization for 3 hours, a water-containing gel was obtained. The water-containing gel was crushed to a size of about 5 mm per side and dried at 150° C. for one hour in an inert oven under a nitrogen atmosphere. The dried polymer was milled by a homogenizer and then classified into particles having a particle size of 106 to 850 µm. The classified polymer in an amount of 100 parts was mixed with 2 parts of propylene glycol, 3 parts of water, and 30 parts of isopropyl alcohol, followed by heat treatment at 170° C. for 30 minutes. The resin obtained as described above was named as a comparative water-absorbing resin (4). The results of measurement of water absorption of the comparative water-absorbing resin (4) are shown in Table 2.

Comparative Example 5

To 54.73 g of an aqueous acrylic ammonium solution obtained in Production Example 1, were added 17.71 g of acrylic acid and 43.1 g of water to obtain 90 g of a 40% by weight aqueous ammonium acrylate/acrylic acid=50/50 solution, which was then mixed with 1 g of activated carbon and stirred for one hour while shielding the light. The resulting solution was filtered to remove the activated carbon, and then 0.0992 g of N,N'-methylenebisacrylamide was added and dissolved in 90 g of the solution as a crosslinking agent. The resulting solution was transferred to a 300 ml separable flask and purged with nitrogen at 30° C. for 30 minutes while being stirred. Polymerization was started by adding 0.0004 g of L-ascorbic acid and 0.046 g of ammonium persulfate, each being dissolved in 1 g of water, to the solution. After performing polymerization for 3 hours, a water-containing gel was obtained. The water-containing gel was crushed to a size of about 5 mm per side and dried at 150° C. for one hour in an inert oven under a nitrogen atmosphere. The dried polymer was milled by a homogenizer and then classified into particles having a particle size of 106 to 850 µm. The classified polymer in an amount of 100 parts was mixed with 2 parts of propylene glycol, 3 parts of water, and 30 parts of isopropyl alcohol, followed by heat treatment at 170° C. for 30 minutes. The resin obtained as described above was named as a comparative water-absorbing resin (5). The results of measurement of water absorption of the comparative water-absorbing resin (5) are shown in Table 2.

Comparative Example 6

To a flask equipped with an agitator, was charged 320 of ion-exchanged water. To a neutralization system in the flask, while keeping the temperature of the system at 20 to 40° C., was added 144 g of acrylic acid (guaranteed reagent grade manufactured by Wako Pure Chemical Industries, Ltd.) and then dropwise added 136 g of a 25% by weight aqueous ammonia to obtain 600 g of an aqueous monomer solution having a neutralization ratio of 100% (ammonium salt 100 mol %) and a concentration of 29.7%.

To 69.2 g of the aqueous monomer solution, was added 0.074 g of N,N'-methylenebisacrylamide. The resulting solution was deaerated with nitrogen gas for 30 minutes and then transferred to a 300 ml separable flask equipped with an agitator and a thermometer in which the air is replaced with nitrogen. To the solution which was kept at a temperature of 30° C. inside, was added 0.0357 g of ammonium persulfate and 0.0003 g of L-ascorbic acid, each being dissolved in 2 g of ion-exchanged water. The reaction immediately started, and the temperature rose.

From 10 minutes after starting the reaction, the solution was heated by using a water bath of 70° C. for 3 hours to obtain a polymer and then cooled to remove the polymer. The resulting polymer was cut to a size of 1 cm per side and then vacuum dried at 100° C. for 3 hours under a pressure of 1 mmHg or less by using a rotary vacuum pump. The resulting dried polymer was milled to a smaller size, vacuum dried for 3 hours in the same manner as described above, and screened with 18 to 50 mesh screens to obtain a dried polymer. A surface-crosslinking agent-containing solution comprising 0.05 g of glycerin, 0.15 g of ion-exchanged water, and 1.5 g of isopropyl alcohol was dropwise added to and mixed with 5 g of the thus obtained dried polymer at 20° C. as a crosslinking agent. The resulting mixture was heat-treated at 160° C. for 40 minutes. The thus obtained resin was named as a comparative water-absorbing resin (6). The results of measurement of water absorption of the comparative water-absorbing resin (6) are shown in Table 2.

Comparative Example 7

The ammonium acrylate obtained in Production Example 1 was diluted to a 30% by weight aqueous solution, and 0.0992 g of N,N'-methylenebisacrylamide was added to and dissolved in 145 g of the solution. The resulting solution was treated with 5.5 g of activated carbon, and then the activated carbon was removed by filtration. The solution treated with activated carbon in an amount of 90 g was transferred to a 300 ml separable flask and purged with nitrogen at 30° C. for 30 minutes while being stirred (ammonium salt 100%). To the nitrogen purged-solution, were added 0.0005 g of L-ascorbic acid and then 0.0466 g of ammonium persulfate. The temperature rose immediately after the addition of the initiator and reached a maximum temperature of 60° C. Polymerization was performed for one hour to obtain a polymer, which was then crushed to about 5 mm and dried at 100° C. for 2 hours in an inert oven. The dried polymer was milled by a homogenizer and then dried at 100° C. for additional 2 hours in an inert oven. The dried polymer was classified into particles having a particle size of 106 μm to 850 μm. The classified polymer in an amount of 2 g was mixed with 0.02 g of glycerin dissolved in a mixed solution of 0.6 g of isopropyl alcohol and 0.06 g of water. The resulting mixture was subjected to heat treatment at 140° C. for one hour. The resin obtained as described above was named as a comparative water-absorbing resin (7). The results of measurement of water absorption of the comparative water-absorbing resin (7) are shown in Table 2.

TABLE 1

| | Carboxy group neutralization ratio (%) | | Thickness of skin structure (μm) | Water-absorption under pressure | | |
|---|---|---|---|---|---|---|
| | central part | external surface | | 0.0 psi | 0.3 psi | 0.8 psi |
| Water-absorbing resin (1) | 82 | 34 | 25 | 50 | 35 | 28 |
| Water-absorbing resin (2) | 74 | 36 | 25 | 53 | 38 | 30 |
| Water-absorbing resin (3) | 77 | 33 | 19 | 51 | 35 | 27 |
| Water-absorbing resin (4) | 61 | 27 | 19 | 43 | 32 | 27 |
| Comparative water-absorbing resin (1) | 49 | 40 | 19 | 31 | 20 | 15 |
| Comparative water-absorbing resin (2) | 70 | 69 | 7 | 26 | 21 | 19 |

TABLE 2

| | Tea-bag method | Water-absorption under pressure | | |
|---|---|---|---|---|
| | | 0.0 psi | 0.3 psi | 0.8 psi |
| Water-absorbing resin (5) | 55 | 47 | 33 | 23 |
| Water-absorbing resin (6) | 56 | 51 | 36 | 26 |
| Water-absorbing resin (7) | 60 | 54 | 34 | 23 |
| Water-absorbing resin (8) | 57 | 52 | 37 | 29 |
| Water-absorbing resin (9) | 53 | 50 | 36 | 29 |
| Water-absorbing resin (10) | 55 | 47 | 34 | 28 |
| Water-absorbing resin (11) | 48 | 45 | 32 | 26 |
| Comparative water-absorbing resin (3) | 35 | 29 | 16 | 8 |
| Comparative water-absorbing resin (4) | 38 | 31 | 22 | 18 |
| Comparative water-absorbing resin (5) | 35 | 30 | 21 | 19 |
| Comparative water-absorbing resin (6)) | 53 | 48 | 31 | 16 |
| Comparative water-absorbing resin (7) | 53 | 46 | 24 | 22 |

The water-absorbing resin and the method for producing the same of the present invention can be suitably utilized in the application fields of highly water-absorbing resins requiring high water absorption performance under pressure such as sanitary materials.

What is claimed is:

1. A water-absorbing resin comprising a polymer molecular chain in which 50 mol % or more of repeating units in the chain are carboxyl group-containing units, wherein:
   a carboxyl group neutralization ratio in the central part of the resin is 60 mol % or more and a carboxyl group neutralization ratio on the external surface of the resin is 50 mol % or less,
   a condensation crosslinking agent (C) for a carboxyl group is distributed throughout the water-absorbing resin,
   the resin has a skin layer having a thickness of 13 μm or more extending inward from the external surface of the resin, and
   the skin layer has a carboxyl group neutralization ratio less than that in the central part of the resin.

2. The water-absorbing resin according to claim 1, wherein 50 mol % or more of neutral carboxylate salts in the polymer molecular chain is an ammonium salt.

3. The water-absorbing resin according to claim 1, wherein the resin has a water absorption capacity of 43 times or more under a pressure of 0.0 psi and a water absorption capacity of 23 times or more under a pressure of 0.8 psi.

4. A method for producing a water-absorbing resin, comprising:
  polymerizing a monomer solution to form a polymer by first adding a crosslinking agent (D) polymerizable with unsaturated monomers and then adding a condensation crosslinking agent (C) for a carboxyl group,
  crushing the resulting polymer,
  drying the crushed polymer,
  milling the dried polymer, and then
  heat-treating the milled polymer;
  or
  polymerizing a monomer solution to form a polymer by first adding a crosslinking agent (D) polymerizable with unsaturated monomers and then adding a condensation crosslinking agent (C) for a carboxyl group,
  crushing the resulting polymer,
  milling the crushed polymer,
  drying the milled polymer, and then
  heat-treating the dried polymer,
  wherein heat treating is performed at a temperature from 100 to 250° C.,
  wherein the monomer solution contains a carboxyl group-containing monomer and satisfies the following conditions (1) and (2):
  (1) before adding the crosslinking agent (D) and the condensation crosslinking agent (C), the monomer solution contains unsaturated carboxylate monomers comprising an ammonium unsaturated carboxylate (A) and an unsaturated carboxylic acid alkali metal salt (B); and
  (2) the percentage of the ammonium unsaturated carboxylate (A) is more than 50 mol % and 100 mol % or less, and the percentage of the unsaturated carboxylic acid alkali metal salt (B) is 0 mol % or more and less than 50 mol %, based on the total amount of unsaturated carboxylate monomers in the monomer solution.

5. The method for producing a water-absorbing resin according to claim 4, which satisfies the following conditions (3) and (4):
  (3) the content of the condensation crosslinking agent (C) for a carboxyl group is 0.01% by weight or more and 20% by weight or less based on the weight of the total polymerizable monomers; and
  (4) the content of the crosslinking agent (D) polymerizable with unsaturated monomers is 0.005 mol % or more and 5 mol % or less based on the weight of the total polymerizable monomers.

6. The method for producing a water-absorbing resin according to claim 4, wherein the ammonium unsaturated carboxylate (A) and the unsaturated carboxylic acid alkali metal salt (B) are each a (meth)acrylic acid salt.

7. A water-absorbing resin produced by the method for producing a water-absorbing resin according to claim 4, wherein the resin has a polymer molecular chain in which 50 mol % or more of repeating units in the chain are carboxyl group-containing units, wherein the carboxyl group neutralization ratio in the central part of the resin is 60 mol % or more and the carboxyl group neutralization ratio on the external surface of the resin is 50 mol % or less.

8. A water-absorbing resin comprising a polymer molecular chain in which 50 mol % or more of repeating units in the chain are carboxyl group-containing units, wherein:
  a carboxyl group neutralization ratio in the central part of the resin is 60 mol % or more and a carboxyl group neutralization ratio on the external surface of the resin is 50 mol % or less,
  a condensation crosslinking agent (C) for a carboxyl group is distributed throughout the water-absorbing resin,
  the polymer has a skin layer having a thickness of 13 μm or more extending inward from the external surface of the polymer,
  the skin layer has a carboxyl group neutralization ratio less than that in the central part of the polymer, and
  the water-absorbing resin is produced by a process comprising polymerizing a monomer solution to form a polymer by first adding a crosslinking agent (D) polymerizable with unsaturated monomers and then adding the condensation crosslinking agent (C) for a carboxyl group.

* * * * *